(12) United States Patent
Agarwal et al.

(10) Patent No.: US 12,444,962 B2
(45) Date of Patent: Oct. 14, 2025

(54) METHODS AND SYSTEMS FOR DETECTING FAULTY BEHAVIOR IN A BATTERY

(71) Applicant: SAMSUNG ELECTRONICS CO., LTD., Suwon-si (KR)

(72) Inventors: Samarth Agarwal, Bengaluru (IN); Seongho Han, Suwon-si (KR); Krishnan Hariharan, Bengaluru (IN); Achyutha Krishna Koneti, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 853 days.

(21) Appl. No.: 17/701,263

(22) Filed: Mar. 22, 2022

(65) Prior Publication Data

US 2022/0216700 A1 Jul. 7, 2022

Related U.S. Application Data

(63) Continuation of application No. PCT/KR2021/013312, filed on Sep. 29, 2021.

(30) Foreign Application Priority Data

Oct. 6, 2020 (IN) .............................. 202041043385
Sep. 14, 2021 (IN) .............................. 202041043385

(51) Int. Cl.
*H02J 7/00* (2006.01)
*B60L 3/00* (2019.01)
*G01R 31/392* (2019.01)

(52) U.S. Cl.
CPC ............ *H02J 7/005* (2020.01); *B60L 3/0046* (2013.01); *G01R 31/392* (2019.01);
(Continued)

(58) Field of Classification Search
CPC ...... H02J 7/005; H02J 7/0048; G01R 31/392; B60L 2240/547; B60L 2240/549
(Continued)

(56) References Cited

U.S. PATENT DOCUMENTS 6,563,318 B2   5/2003   Kawakami et al.
9,157,968 B1   10/2015  Taylor et al.
(Continued)

FOREIGN PATENT DOCUMENTS

CN   104849667 A   8/2015
CN   110927606 A   3/2020
(Continued)

OTHER PUBLICATIONS

Communication issued May 23, 2022 by the India Patent Office in counterpart Indian Patent Application No. 202041043385.
(Continued)

*Primary Examiner* — Richard V Muralidar
(74) *Attorney, Agent, or Firm* — Sughrue Mion, PLLC

(57) ABSTRACT

Provided is a method for detecting at least one anomaly in a battery, the method including obtaining, by a processor, charging-discharging data of the battery that has undergone a preset number of charging-discharging cycles, and obtaining, by the processor, a probability of the battery being healthy and at least one probability of the battery having an anomaly of at least one class, based on a correlation between charging-discharging data of a plurality of reference batteries and the charging-discharging data of the battery.

15 Claims, 14 Drawing Sheets

(52) U.S. Cl.
CPC ....... *H02J 7/0048* (2020.01); *B60L 2240/547* (2013.01); *B60L 2240/549* (2013.01)

(58) Field of Classification Search
USPC ................................ 320/128, 132, 134–136
See application file for complete search history.

(56) References Cited

U.S. PATENT DOCUMENTS

| | | |
|---|---|---|
| 9,465,084 B2 | 10/2016 | Park |
| 10,372,183 B2 | 8/2019 | Yamamoto et al. |
| 11,307,263 B2 | 4/2022 | Chung et al. |
| 2006/0232277 A1 | 10/2006 | Murakami et al. |
| 2013/0234672 A1* | 9/2013 | Kubota ................. H02J 7/0016 320/134 |
| 2015/0234015 A1 | 8/2015 | Park |
| 2017/0031404 A1 | 2/2017 | Yamamoto et al. |
| 2019/0086478 A1 | 3/2019 | Park et al. |
| 2019/0120908 A1* | 4/2019 | Naha .................... G01R 31/367 |
| 2020/0081068 A1 | 3/2020 | Kim et al. |
| 2020/0408848 A1 | 12/2020 | Chung et al. |
| 2021/0088591 A1* | 3/2021 | Naha .................... H01M 10/48 |

FOREIGN PATENT DOCUMENTS

| | | |
|---|---|---|
| EP | 3 671 244 A1 | 6/2020 |
| JP | 2002-345158 A | 11/2002 |
| JP | 2004-14205 A | 1/2004 |
| JP | 2014063621 A | 4/2014 |
| JP | 2015-27223 A | 2/2015 |
| KR | 1020170035825 A | 3/2017 |
| KR | 10-1776844 B1 | 9/2017 |
| KR | 10-2019-0048089 A | 5/2019 |
| KR | 10-2020-0050899 A | 5/2020 |
| KR | 1020190106763 A | 9/2021 |
| WO | 2016/166555 A1 | 10/2016 |
| WO | 2019021095 A1 | 1/2019 |

OTHER PUBLICATIONS

Hearing Notice issuance on Sep. 11, 2024 by the Indian Patent Office for Indian Patent Application No. 202041043385.

Naha et al., "Internal short circuit detection in Li-ion batteries using supervised machine learning," Scientific Reports, 10:1301, Jan. 28, 2020, total 10 pages.

Banaei et al., "Real Time Condition Monitoring in Li-Ion Batteries via Battery Impulse Response," IEEE Xplore, Downloaded on Jan. 4, 2022, total 6 pages.

Communication dated Jan. 21, 2022, issued by the International Searching Authority in counterpart International Application No. PCT/KR2021/013312 (PCT/ISA/210 and PCT/ISA/237).

* cited by examiner

METHODS AND SYSTEMS FOR DETECTING FAULTY BEHAVIOR IN A BATTERY

CROSS-REFERENCE TO RELATED APPLICATION

This application is a bypass continuation of International Application No. PCT/KR2021/013312, filed on Sep. 29, 2021, which is based on and claims priority to Indian Patent Application No. 202041043385, filed on Oct. 6, 2020 and Indian Patent Application No. 202041043385 filed on Sep. 14, 2021, in the Intellectual Property India, the disclosures of which are incorporated by reference herein in their entireties.

BACKGROUND

Embodiments herein relate to battery behavior, and more particularly to methods and systems for detecting presence of defective behavior in a battery, identifying type of defect defect present in the battery, and an extent of the defect.

With proliferation of lithium (Li)-ion batteries in devices, such as smart phones and Internet of Things (IoT) devices, and electric vehicles, ensuring safety from hazards arising due to battery complications is a concern. One of the methods of ensuring safety is detection of battery defects or abnormal behavior of the battery due to presence of one or more defects. The battery defects can be critical as they are often ascribed to as primary causes of hazards and accidents involving Li-ion batteries. The existing methods used for the detection of battery defects require offline measurements of one or more battery parameters, and performing the measurements may necessitate removing or unpacking the battery from the devices or electric vehicles, which can be cumbersome.

The measurement of one or more battery parameters, and overall process of detection of battery defects using the one or more measured parameters, may be tedious. The existing process of detection of battery defects requires heavy data processing and specialized measurement arrangements. The existing process may require non-standard charging/discharging data, which is not readily available in the devices or electric vehicles hosting the battery. In addition, the detection of battery defects using a specific process may be limited to a specific type of battery. Hence, it may not be suitable to implement the processes involved in the detection of battery defects in battery management systems installed in the devices and electric vehicles.

In order to enable online detection of battery defects, for example, detection of battery defects in the devices or electric vehicles, the battery management systems of the devices or electric vehicles may need to be equipped with specialized hardware components. The hardware components can implement the processes used in the detection of battery defects. These hardware components are heavy, and, therefore, likely to increase the processing load, operation, size (especially for devices), and power consumption, of the devices or electric vehicles. The processes involved in the detection of battery defects may modify existing protocols of battery charging for collecting information necessary for detecting battery defects.

The battery defect detection processes may not be able to forewarn the users of the devices or electric vehicles significantly prior to the battery becoming seriously afflicted or prior to the battery exhibiting near apparent defective behavior. A late warning may undo the advantages offered by the processes of detection of battery defects, as a serious affliction of the battery that may be unknown to the user can increase the threat of battery hazards or accidents. The existing mechanisms are may be configured to only compute state of health (SOH) of a battery of a device or an electric vehicle. The SOH value may not be sufficient for predicting whether a battery related hazard or accident is imminent, determining or identifying one or more causes of failure of the battery that may trigger a battery related hazard or a battery related accident, or alert the users of the devices or electric vehicles about any existing threat of occurrence of the battery related hazard or the battery related accident.

SUMMARY

One or more embodiments herein provide methods and systems for providing a sensing framework for detecting anomalies present in a battery, which are acting as factors contributing to defective behavior in the battery.

One or more embodiments herein is also directed to utilizing classification techniques such as statistical models or deep learning networks, which are trained to classify healthy behavior and defective behavior, type of anomaly present in the battery, extent of anomaly, etc., based on charging-discharging data of the battery, a plurality of reference healthy batteries, and a plurality of reference defective batteries, wherein a healthy battery may undergo degradation with increasing charging-discharging cycles, wherein a defective battery may exhibit defective behavior due to factors such as abuse, defective operation, misuse, manufacturing defects, excessive heating, stress, dent, etc.

One or more embodiments herein is also directed to observing variations of voltage with respect to State of Charge (SOC) and current with respect to SOC, in the plurality of reference healthy batteries and the plurality of reference defective batteries, and utilize the observed variations as the charging-discharging data to train the statistical models and the deep learning networks.

One or more embodiments herein is also directed to obtaining probability distributions of variation of battery voltage with respect to SOC and variation of battery current with respect to SOC, for the plurality of reference healthy batteries and the plurality of reference defective batteries, for correlating the charging-discharging data of the battery, and the charging-discharging data of the plurality of reference healthy batteries and defective batteries.

One or more embodiments herein is also directed to obtaining reliability index scores using the classification techniques to determine whether a battery is healthy or defective, wherein detection of a defective battery includes detecting the presence of an anomaly in the battery, type of the anomaly present in the battery, and an extent of the anomaly present in the battery.

According to an aspect of an embodiment, there is provided a method for detecting at least one anomaly in a battery, the method including obtaining, by a processor, charging-discharging data of the battery that has undergone a preset number of charging-discharging cycles, and obtaining, by the processor, a probability of the battery being healthy and at least one probability of the battery having an anomaly of at least one class, based on a correlation between charging-discharging data of a plurality of reference batteries and the charging-discharging data of the battery.

The charging discharging data of the plurality of reference batteries may include charging-discharging data of a plurality of healthy reference batteries and charging-discharging data of a plurality of reference batteries having anomaly of the at least one class.

The charging-discharging data of the battery and the charging-discharging data of the plurality of reference batteries may include one of a variation of a voltage and a variation of a current with respect to state-of-charge (SOC) during a charging-discharging cycle.

The correlation may be obtained based on a plurality of probability density functions (PDFs) of the charging-discharging data of the plurality of reference batteries.

The method may further include obtaining, by the processor, a reliability index indicating a level of reliability of usage of the battery, wherein the reliability index is obtained based on the probability of the battery being healthy, and the at least one probability of the battery having anomaly of the at least one class.

The method may further include obtaining, by the processor, at least one anomaly class index indicating at least one level of anomaly of the at least one class, wherein the at least one anomaly class index is obtained based on the probability of the battery being healthy, and the at least one probability of the battery having the anomaly of the at least one class.

The reliability index and the at least one anomaly class index may be obtained based on one of statistical classifier and a deep learning based classifier, wherein the deep learning based classifier is one of a dense neural network and a Long Short-Term Memory (LSTM) neural network.

The method may further include providing, by the processor, a message indicating an instruction to replace the battery, based on the level of reliability of usage of the battery being less than a preset reliability threshold.

According to another aspect of an example embodiment, there is provided a processor configured to detect at least one anomaly in a battery, the processor being configured to obtain charging-discharging data of the battery that has undergone a preset number of charging-discharging cycles, and obtain a probability of the battery being healthy and at least one probability of the battery having an anomaly of the at least one class, based on a correlation between charging-discharging data of a plurality of reference batteries and the charging-discharging data of the battery.

The charging discharging data of the plurality of reference batteries may include charging-discharging data of a plurality of healthy reference batteries and charging-discharging data of a plurality of reference batteries having anomaly of the at least one class.

The charging-discharging data of the battery and the charging-discharging data of the plurality of reference batteries may include one of a variation of a voltage and a variation of a current with respect to state-of-charge (SOC) during a charging-discharging cycle.

The correlation may be obtained using a plurality of probability density functions (PDFs) of the charging-discharging data of the plurality of reference batteries.

The processor may be further configured to obtain a reliability index indicating a level of reliability of usage of the battery, wherein the reliability index is obtained based on the probability of the battery being healthy, and the at least one probability of the battery having the anomaly of the at least one class.

The processor may be further configured to obtain at least one anomaly class index indicating at least one level of anomaly of the at least one class, wherein the at least one anomaly class index is obtained based on the probability of the battery being healthy, and the at least one probability of the battery having the anomaly of the at least one class.

The reliability index and the at least one anomaly class index may be obtained based on one of statistical classifier and a deep learning based classifier, wherein the deep learning based classifier is one of a dense neural network and a Long Short-Term Memory (LSTM) neural network.

According to another aspect of an example embodiment, there is provided an electronic device including a battery, and a processor configured to detect at least one anomaly in the battery, the processor being configured to obtain charging-discharging data of the battery that has undergone a preset number of charging-discharging cycles, and obtain a probability of the battery being healthy and at least one probability of the battery having an anomaly of the at least one class, based on a correlation between charging-discharging data of a plurality of reference batteries and the charging-discharging data of the battery.

The charging discharging data of the plurality of reference batteries may include charging-discharging data of a plurality of healthy reference batteries and charging-discharging data of a plurality of reference batteries having anomaly of the at least one class.

The charging-discharging data of the battery and the charging-discharging data of the plurality of reference batteries may include one of a variation of a voltage and a variation of a current with respect to state-of-charge (SOC) during a charging-discharging cycle.

The correlation may be obtained using a plurality of probability density functions (PDFs) of the charging-discharging data of the plurality of reference batteries.

The processor may be further configured to obtain a reliability index indicating a level of reliability of usage of the battery, wherein the reliability index is obtained based on the probability of the battery being healthy, and the at least one probability of the battery having the anomaly of the at least one class.

DESCRIPTION OF DRAWINGS

Embodiments herein are illustrated in the accompanying drawings, throughout which like reference letters indicate corresponding parts in the various figures. The embodiments herein will be better understood from the following description with reference to the drawings, in which.

DETAILED DESCRIPTION

Figure 1:
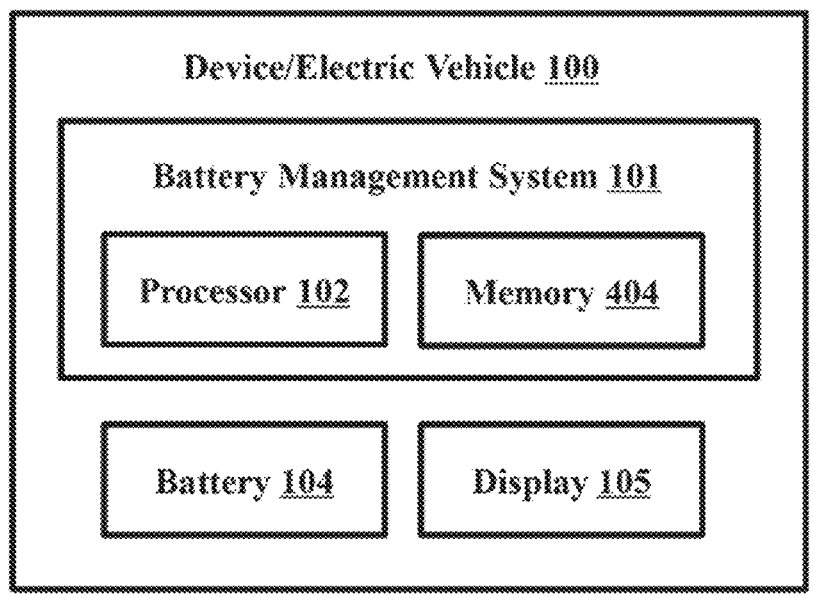
FIG. 1 depicts an example device or electric vehicle configured to determine and/or predict defective battery behavior based on detection of anomalies of one or more classes in a battery of the device or electric vehicle, according to embodiments.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein disclose methods and systems for providing a sensing framework for detecting presence of anomalies in a battery, which are likely to act as factors contributing to defective battery behavior in the battery. Referring now to the drawings, and more particularly to FIGS. 1 through 10, where similar reference characters denote corresponding features consistently throughout the figures, there are shown embodiments.

FIG. 1 depicts an example device or electric vehicle 100 configured to determine and/or predict defective battery behavior based on detection of anomalies of one or more classes in a battery of the device or electric vehicle 100 according to embodiments. As depicted in FIG. 1, the device or electric vehicle 100 comprises a battery management system (BMS) 101, a battery 104, and a display 105. In an embodiment, the BMS 101 can include a processor 102 and a memory 103. The BMS 101 further includes associated circuitry, which can be utilized by the processor 102 for detecting the anomalies of one or more classes in the battery 104. As the detection of the anomalies of one or more classes is performed within the device or electric vehicle 100, the detection may be an online detection. In another embodiment, the processor 102 and the associated circuitry can be included as a part in an external system. The battery 104 may need to be integrated to the external system to enable the processor 102 to detect the anomalies of one or more classes in the battery 104.

The BMS 101 is configured to sense anomalies in the battery 104 belonging to a plurality of classes, leading to defective behavior of the battery 104. The BMS 101 can be configured to detect anomalies of one or more classes and the one or more levels of the anomalies of one or more classes. The detection of level of anomaly allows alerting a user of the device or electric vehicle 100 about an imminent battery related hazard or accident.

The BMS 101 can obtain charging-discharging data of a plurality of reference batteries. The charging-discharging data comprises variation of battery parameters such as battery voltage and battery current with respect to state of charge (SOC) during a charging-discharging cycle. The plurality of reference batteries can include a plurality of healthy reference batteries and a plurality of reference batteries having anomalies of one or more classes. In an example, the anomaly classes include swelling, bending, denting, and so on. The BMS 101 can obtain a probability density function (PDF) of the charging-discharging data of the plurality of healthy reference batteries. The BMS 101 can obtain one or more PDFs of the charging-discharging data of the plurality of reference batteries having anomalies of one or more classes.

Figure 2A:
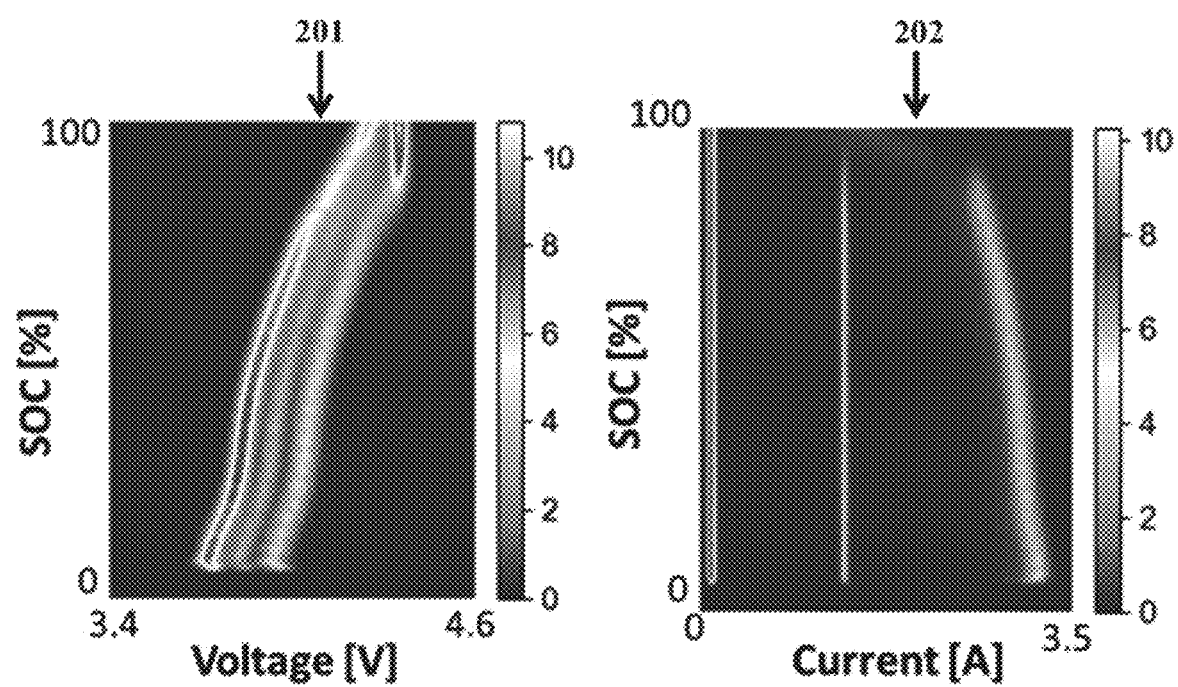
FIGS. 2A, 2B, 2C, 2D, and 2E depict example plots of probability density functions (PDFs) of charging-discharging data of a plurality of reference batteries according to embodiments.

FIGS. 2A-2E depict example plots of PDFs of charging-discharging data of a plurality of reference batteries according to embodiments. As depicted in FIG. 2A, the plots depict two PDFs that have been obtained based on the charging-discharging data of a plurality of reference healthy batteries. The charging-discharging data comprises variation of battery parameters with respect to variation of SOC. The plot 201 depicts PDF of variation of voltage with respect to SOC. The plot 202 depicts PDF of variation of current with respect to SOC. The plurality of reference healthy batteries can be considered as fully charged when the SOC is 100%, the voltage is 4.6 Volts, and the current is 3.5 Amperes. The plurality of reference healthy batteries can be considered as fully discharged when the SOC is 0%, the voltage is 3.4 Volts, and the current is 0 Amperes.

Figure 2B:
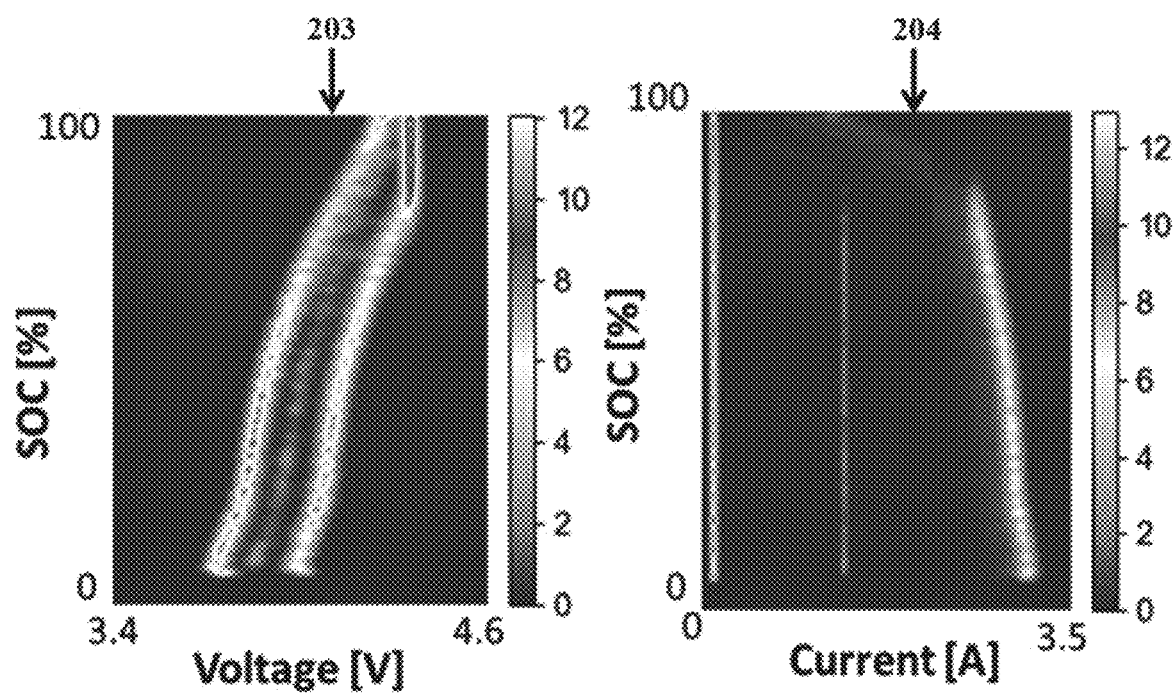

As depicted in FIG. 2B, the plots depict two PDFs that have been obtained based on the charging-discharging data of a plurality of reference batteries having anomaly of class bending. The charging-discharging data comprises variation of parameters of plurality of reference batteries with respect to variation of SOC, and the devices or electric vehicles (100) hosting the plurality of reference batteries are subjected to bending, either accidentally or voluntarily. The plot 203 depicts PDF of variation of voltage with respect to SOC. The plot 204 depicts PDF of variation of current with respect to SOC. The plurality of reference batteries with bending anomaly can be considered as fully charged when the SOC is 100%, the voltage is 4.6 Volts, and the current is 3.5 Amperes. The plurality of reference batteries with bending anomaly can be considered as fully discharged when the SOC is 0%, the voltage is 3.4 Volts, and the current is 0 Amperes.

Figure 2C:
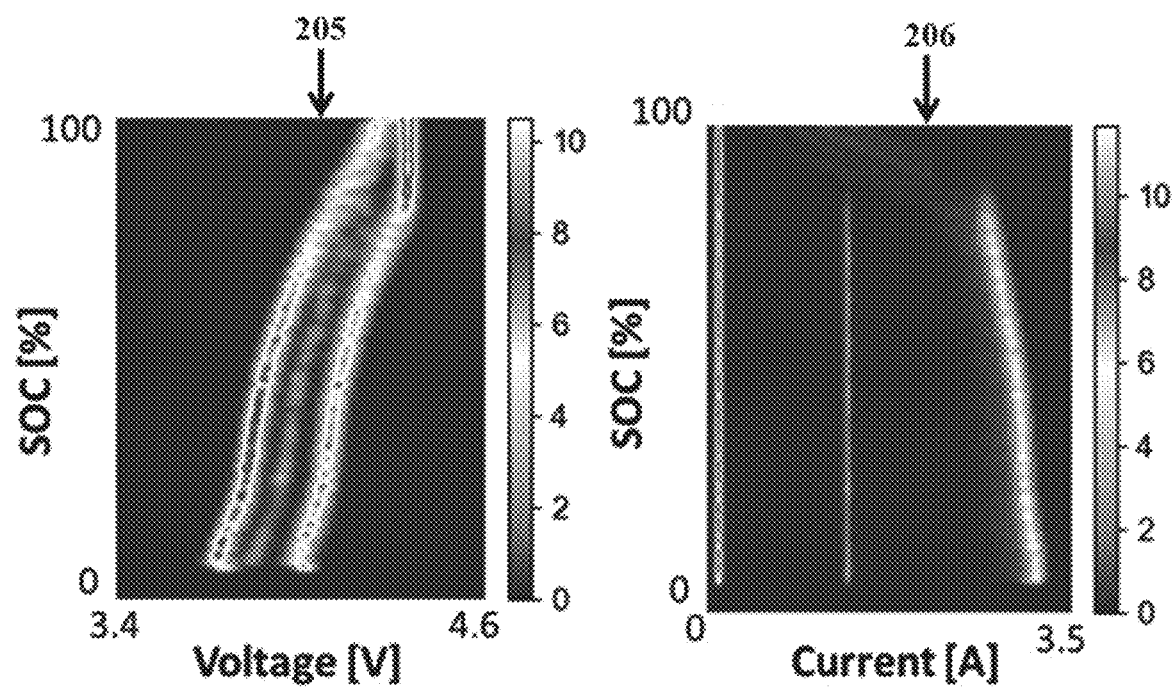

As depicted in FIG. 2C, the plots depict two PDFs that have been obtained based on the charging-discharging data of a plurality of reference batteries having anomaly of class bottom-side dent. The charging-discharging data, herein, comprises variation of parameters of plurality of reference batteries with respect to variation of SOC, and the devices or electric vehicles (100) hosting the plurality of reference batteries are subjected to dent at the bottom-side, either accidentally or voluntarily. The plot 205 depicts PDF of variation of voltage with respect to SOC. The plot 206 depicts PDF of variation of current with respect to SOC. The plurality of reference batteries with bottom-side dent anomaly can be considered as fully charged when the SOC is 100%, the voltage is 4.6 Volts, and the current is 3.5 Amperes. The plurality of reference batteries with bottom-side dent anomaly can be considered as fully discharged when the SOC is 0%, the voltage is 3.4 Volts, and the current is 0 Amperes.

Figure 2D:
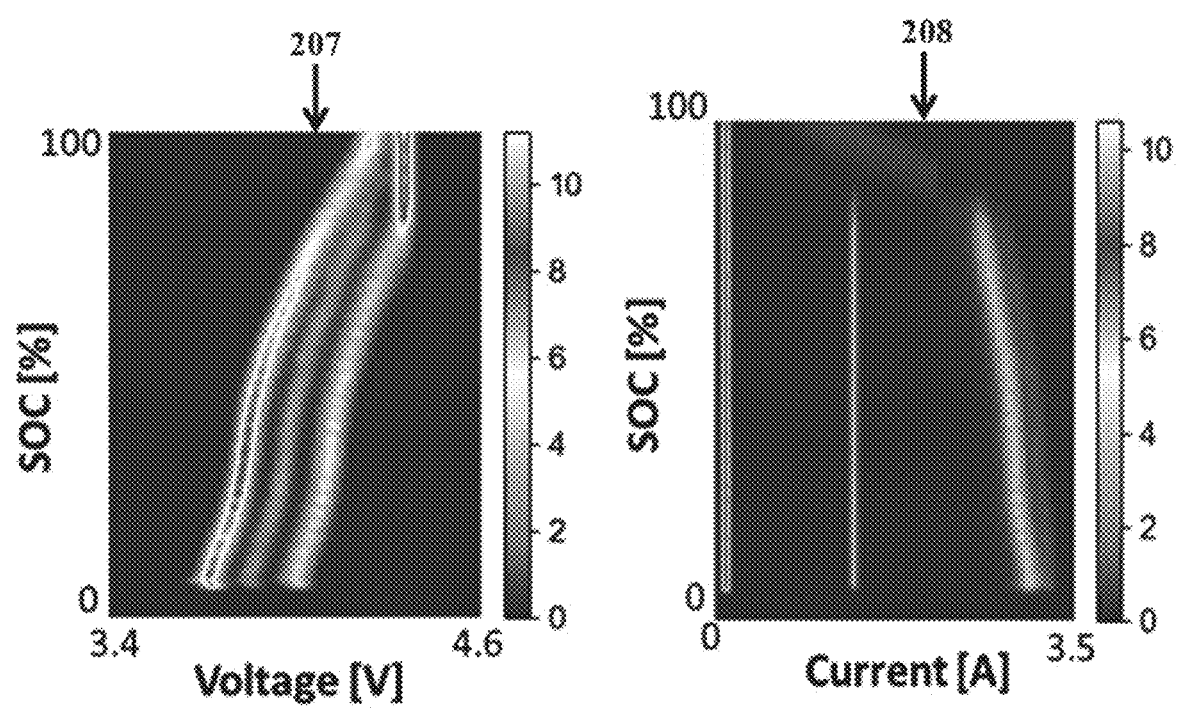

As depicted in FIG. 2D, the plots depict two PDFs that have been obtained based on the charging-discharging data of a plurality of reference batteries having anomaly of class swelling, viz., high-T swelling. The charging-discharging data, herein, comprises variation of parameters of plurality of reference batteries with respect to variation of SOC, and the plurality of reference batteries are swelled. The plot 207 depicts a PDF of variation of voltage with respect to SOC. The plot 208 depicts a PDF of variation of current with respect to SOC. The plurality of reference batteries with swelling anomaly can be considered as fully charged when the SOC is 100%, the voltage is 4.6 Volts, and the current is 3.5 Amperes. The plurality of reference batteries with swelling anomaly can be considered as fully discharged when the SOC is 0%, the voltage is 3.4 Volts, and the current is 0 Amperes.

Figure 2E:
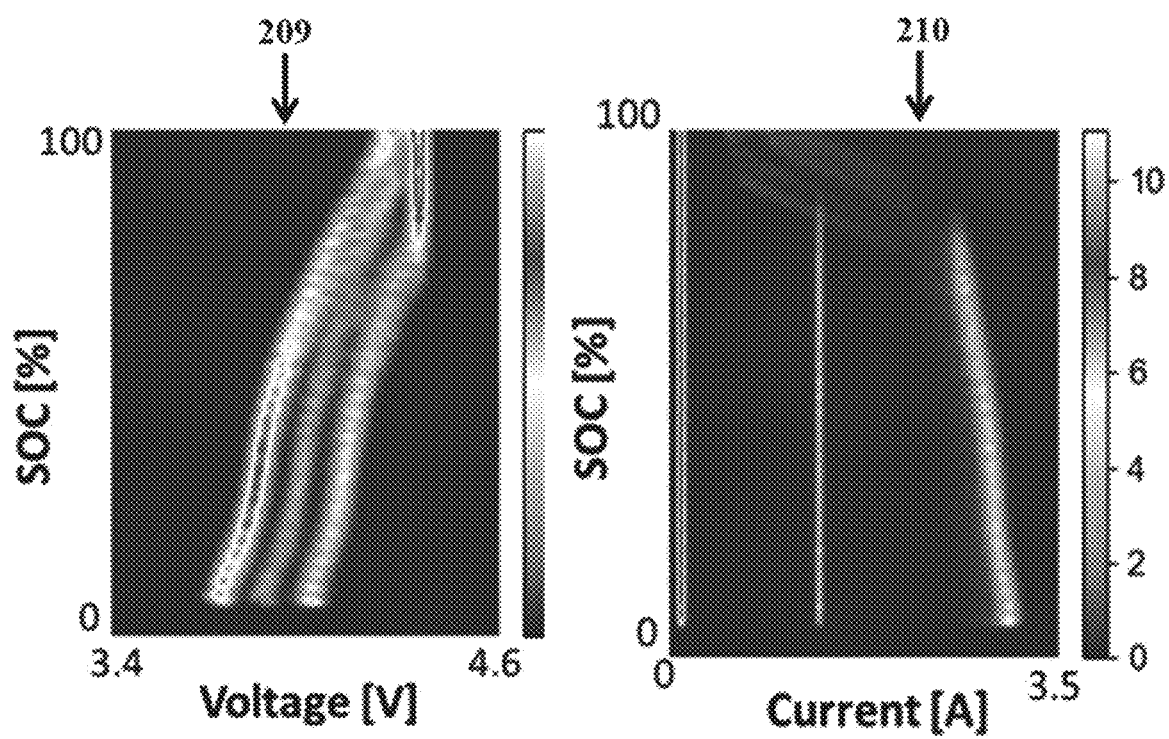

As depicted in FIG. 2E, the plots depict two PDFs that have been obtained based on the charging-discharging data of a plurality of reference batteries having anomaly of class accelerated cycling. The charging-discharging data, herein, comprises variation of parameters of plurality of reference batteries with respect to variation of SOC, and the plurality of reference batteries have been charged and discharged at a high frequency. The plot 209 depicts a PDF of variation of voltage with respect to SOC. The plot 208 depicts a PDF of variation of current with respect to SOC. The plurality of reference batteries, with anomaly due to accelerated cycling, can be considered as fully charged when the SOC is 100%, the voltage is 4.6 Volts, and the current is 3.5 Amperes. The plurality of reference batteries with anomaly, due to accelerated cycling, can be considered as fully discharged when the SOC is 0%, the voltage is 3.4 Volts, and the current is 0 Amperes.

The BMS 101 can monitor the battery parameters, viz., voltage, current, and SOC. The BMS 101 can monitor variations of voltage of the battery 104 with respect to the SOC of the battery 104, and variations of current of the battery 104 with respect to the SOC of the battery 104. The variations of voltage and variations of current with respect to SOC constitute the charging-discharging data of the battery 104 hosted in the device or an electric vehicle 100. The BMS 101 can obtain charging-discharging data each time the battery 104 undergoes a charging-discharging cycle.

The BMS 101 can determine a correlation between the charging-discharging data of the plurality of reference batteries and the charging-discharging data of the battery 104 hosted in the device or the electric vehicle 100. In an embodiment, the BMS 101 can determine the correlation by determining a probability of the battery 104 being healthy (Phealthy) and determining one or more probabilities (Panomaly_class-1-N) of the battery 104 possessing the anomalies of one or more classes. The probability of the battery being healthy (Phealthy) can be determined based on the PDF of the charging-discharging data of the plurality of healthy reference batteries (depicted in FIG. 2A). The one or more probabilities of the battery possessing the anomalies of one or more classes can be determined based on the one or more PDFs of the charging-discharging data of the plurality of reference batteries having anomalies of one or more classes, for example, depicted in FIG. 2B for class bending (device or electric vehicle 100), depicted in FIG. 2C for class bottom-side dent (device or electric vehicle 100), depicted in FIG. 2D for class swelling, and depicted in FIG. 2E for class accelerated cycling.

The BMS 101 can determine a reliability index each time the battery 104 undergoes a charging-discharging cycle. The reliability index indicates a level of reliability of usage of the battery 104. If the reliability index is high, the battery 104 can be considered safe or healthy. If the reliability index is low, the battery 104 can be considered defective or unsafe, i.e., prone to hazard or accident related to the battery 104. The BMS 101 can be configured to interpret the condition of the battery 104 as healthy or defective based on a threshold value of the reliability index. If the BMS 101 determines that the value of the reliability index is greater than the preset threshold value of the reliability index, then BMS 101 can interpret the condition of the battery 104 as healthy. On the other hand, if the BMS 101 determines that the value of the reliability index is less than the preset threshold value of the reliability index, then BMS 101 can interpret the condition of the battery 104 as defective.

Figure 3:
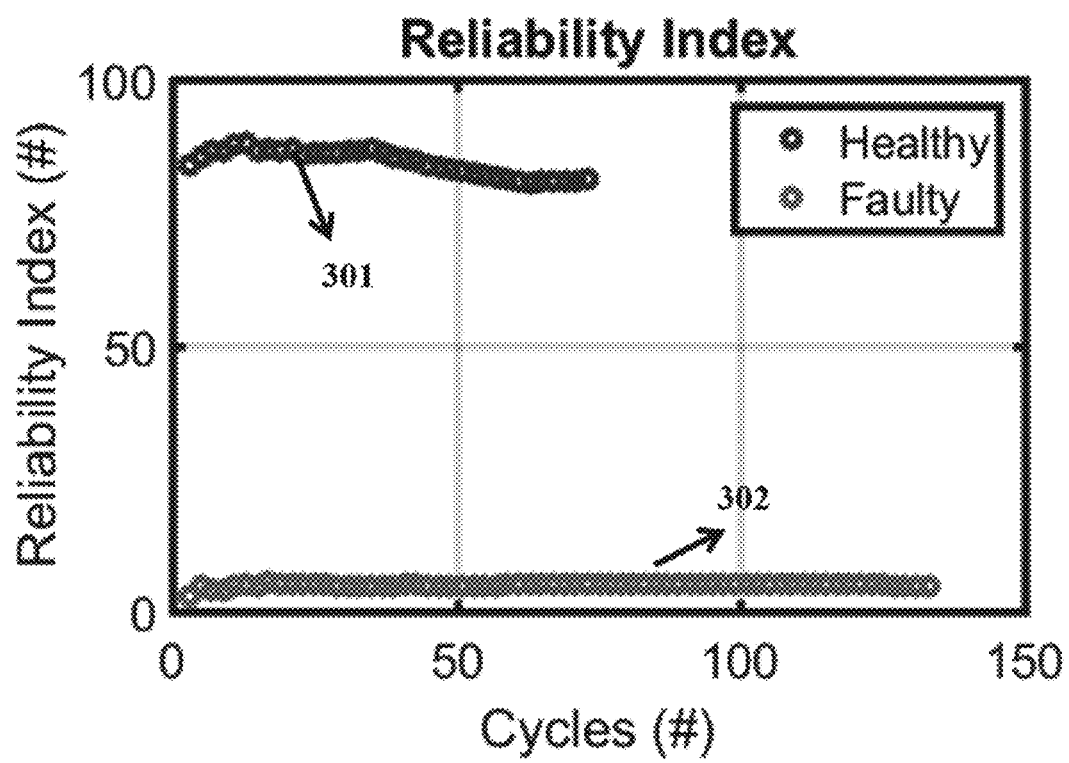
FIG. 3 depicts an example plot of reliability index with respect to number of charging-discharging cycles undergone by the battery according to embodiments.

In an embodiment, the BMS 101 can determine the reliability index based on the probability of the battery being healthy (Phealthy), and the one or more probabilities of the battery having anomalies of the one or more classes (Panomaly_class-1-N). In an embodiment, the reliability index can be determined using one of statistical classifier or a deep learning network based classifier. In an embodiment, the deep learning network based classifier can be a dense neural network. In another embodiment, the deep learning network based classifier can be a Long Short-Term Memory (LSTM) neural network. FIG. 3 depicts an example plot of reliability index with respect to number of charging-discharging cycles undergone by the battery 104 according to embodiments. The plot 301 depicts the reliability index levels of the battery 104 as the battery 104 undergoes increasing charging-discharging cycles, if the battery 104 is healthy. The plot 302 depicts the reliability index levels of the battery 104 as the battery 104 undergoes increasing charging-discharging cycles, if the battery 104 is defective. As depicted in FIG. 3, the battery 104 is interpreted as healthy if the reliability index is high (indicated in plot 301). The battery 104 can be interpreted as defective, if the reliability index is low (indicated in plot 302).

Figure 4:
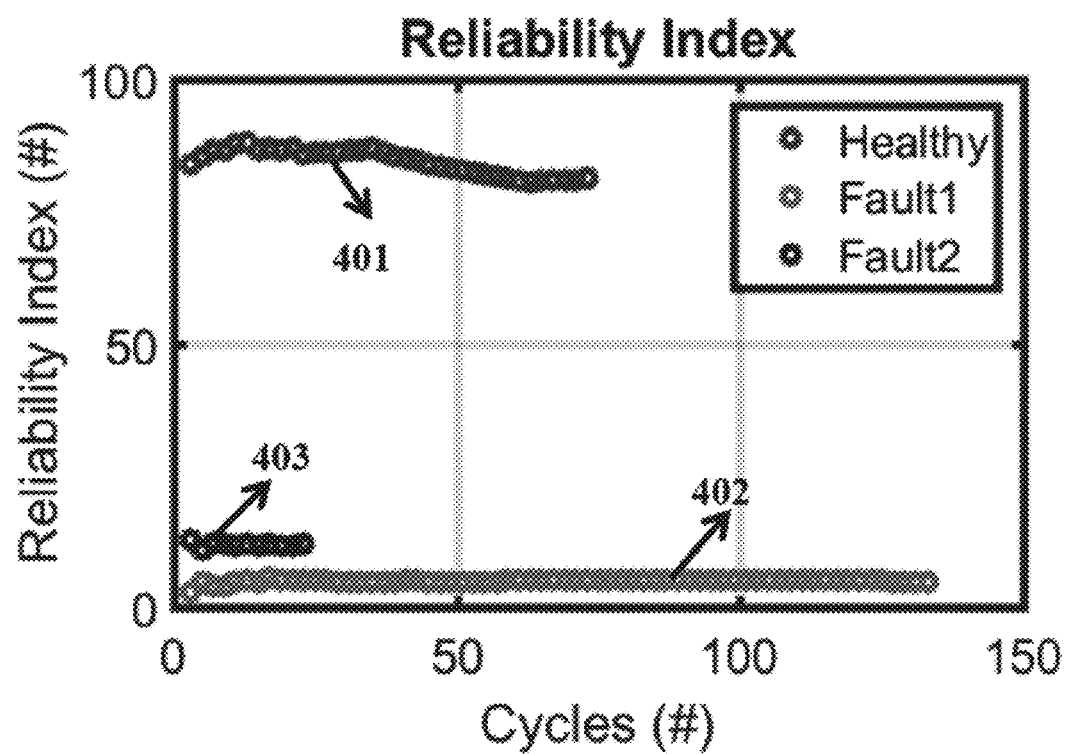
FIG. 4 depicts an example plot of reliability index with respect to number of charging-discharging cycles undergone by the battery, for the battery being healthy and the battery having anomalies of two classes according to embodiments.
Figure 5:
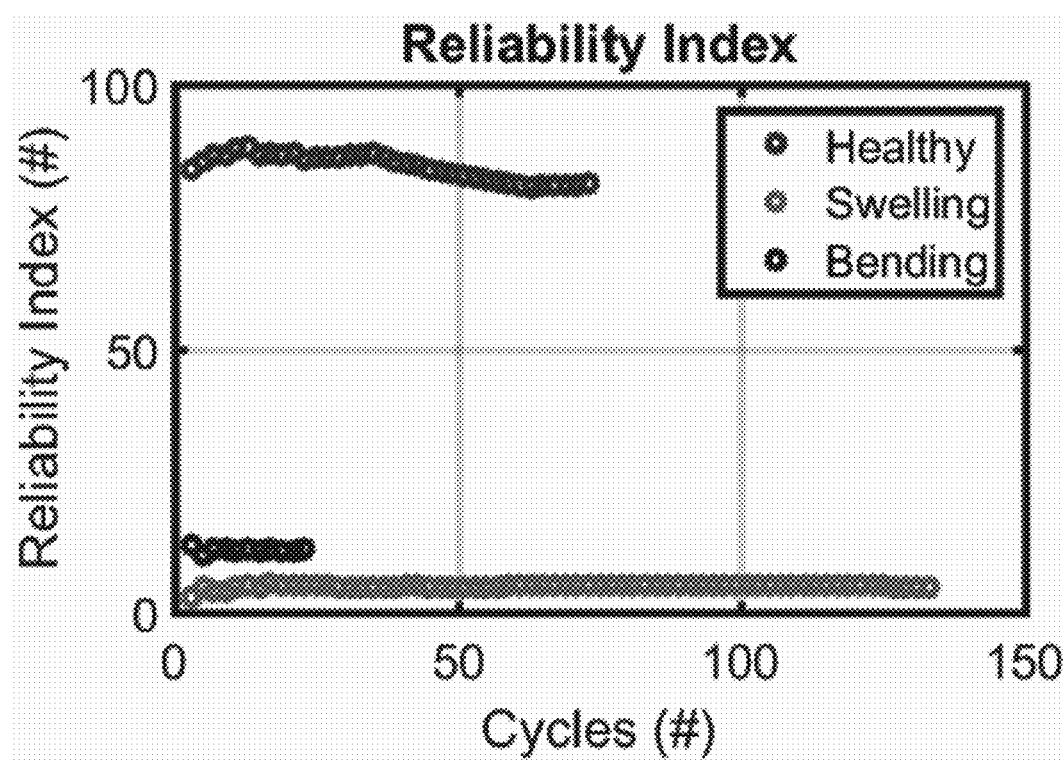
FIG. 5 depicts an example plot of reliability index with respect to number of charging-discharging cycles undergone by the battery, for the battery being healthy and the battery having anomalies of classes swelling and bending according to embodiments.

FIG. 4 depicts an example plot of reliability index with respect to number of charging-discharging cycles undergone by the battery 104, for the battery 104 being healthy and the battery 104 having anomalies of two classes according to embodiments. The plot 401 depicts the reliability index levels of the battery 104, as the battery 104 undergoes increasing charging-discharging cycles, if the battery 104 is healthy. The plot 402 depicts the reliability index levels of the battery 104, as the battery 104 undergoes increasing charging-discharging cycles, if the battery 104 is defective due to having an anomaly of class fault-1. The plot 403 depicts the reliability index levels of the battery 104 as the battery 104 undergoes increasing charging-discharging cycles, if the battery 104 is defective due to having an anomaly of class fault-2. As depicted in FIG. 4, the reliability index levels decrease if the battery is defective. The defect is more severe when the battery 104 is having the anomaly of class fault-1 compared to when the battery 104 is having the anomaly of class fault-2. FIG. 5 depicts an example plot of reliability index with respect to number of charging-discharging cycles undergone by the battery 104, for the battery 104 being healthy and the battery 104 having anomalies of classes swelling and bending according to embodiments. As depicted in FIG. 5, the defect is more severe when the battery 104 is having the anomaly of class swelling, compared to when the battery 104 is having the anomaly of class bending.

Figure 6:
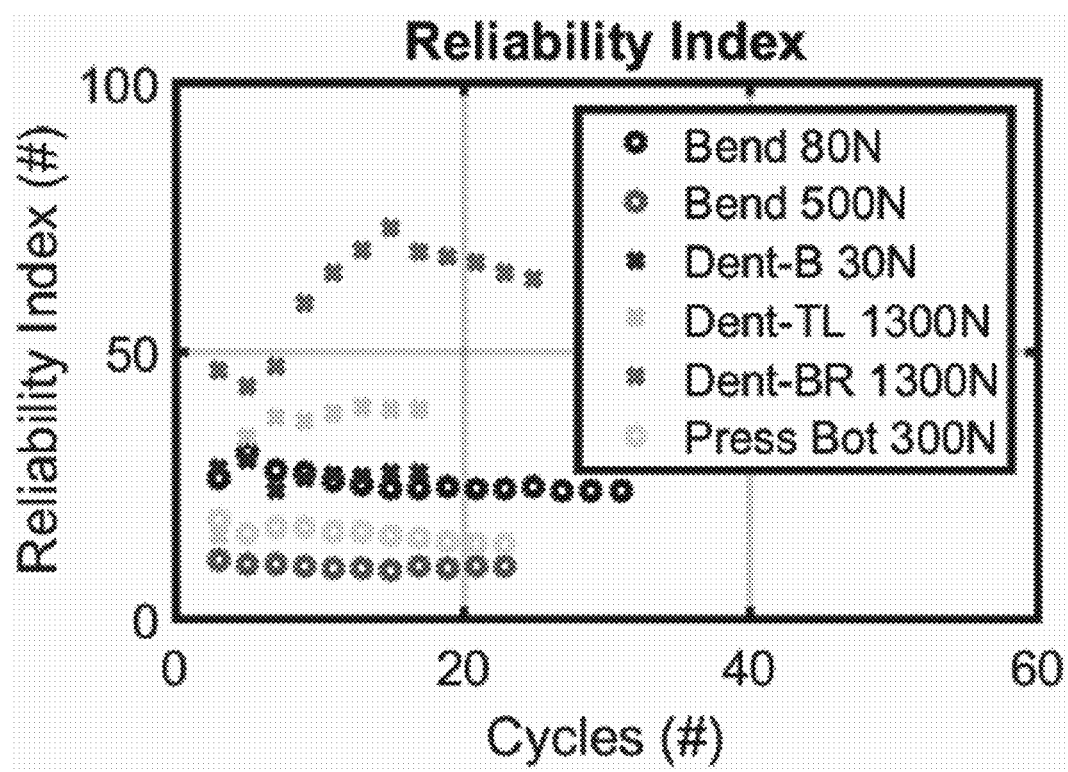
FIG. 6 depicts an example plot of reliability index with respect to number of charging-discharging cycles undergone by the battery for the battery being defective, due to the battery having anomalies of different classes according to embodiments.

FIG. 6 depicts an example plot of reliability index with respect to number of charging-discharging cycles undergone by the battery 104, for the battery 104 being defective due to the battery 104 having anomalies of different classes according to embodiments. As depicted in FIG. 6, the reliability index of the battery 104 varies for different types of mechanical abuse undergone by the device or the electric vehicle 100 hosting the battery 104. The different types of mechanical abuse undergone by the device or the electric vehicle 100, hosting the battery 104, include, for example, 'Bend 80 Newton (N)', 'Bend 500 N', 'Dent-B 30 N', 'Dent-TL 1300 N', 'Dent-BR 1300 N', and 'Press Bot 300 N'. The reliability index is higher when the device or the electric vehicle 100, hosting the battery 104, undergoes a mechanical abuse of force 500 N (causing a bent), compared to when the device or the electric vehicle 100 undergoes other forms of mechanical abuse as mentioned.

Figure 7:
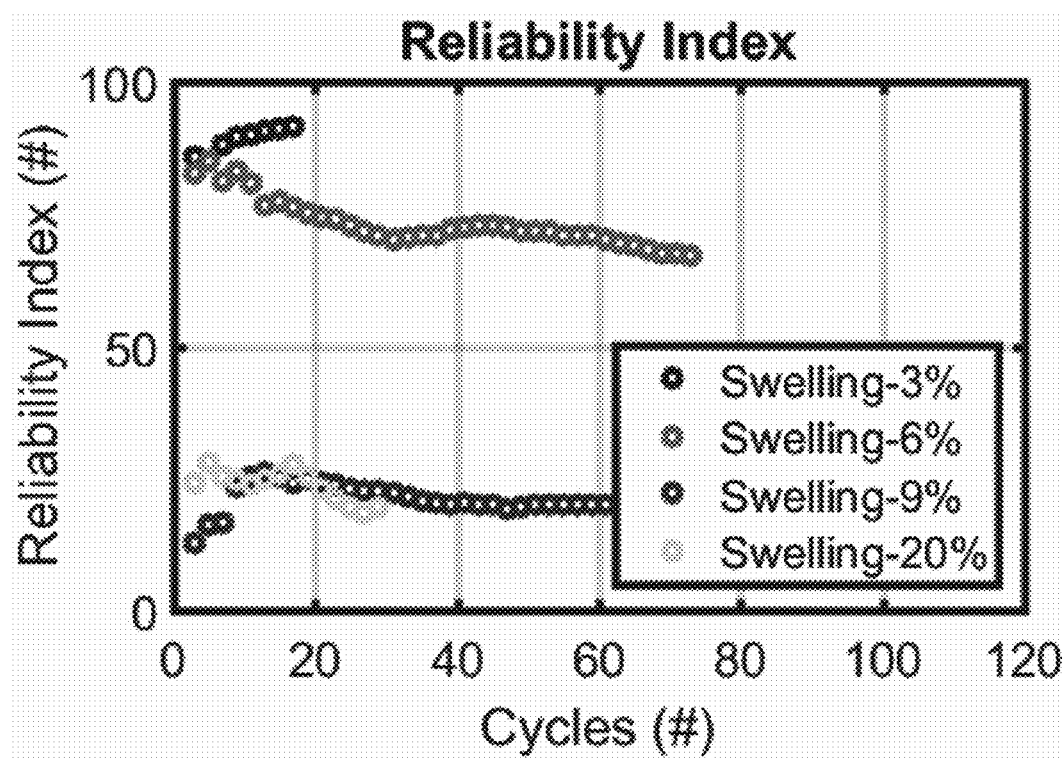
FIG. 7 depicts an example plot of reliability index with respect to number of charging-discharging cycles undergone by the battery for the battery being defective, due to the battery having different degrees of anomaly of class swelling according to embodiments.

FIG. 7 depicts an example plot of reliability index with respect to number of charging-discharging cycles undergone by the battery 104 for the battery 104 being defective, due to the battery 104 having different degrees of anomaly of class swelling according to embodiments. As depicted in FIG. 7, the value of reliability index of the battery 104 decreases when the degree of swelling increases. The reliability index is higher when the degree of swelling of the battery 104 is 3%, compared to the reliability index when the degree of swelling of the battery 104 is 6%, 9%, or 20%. The reliability index is lowest when the degree of swelling of the battery 104 is 20%, compared to the reliability index when the degree of swelling of the battery 104 is 9%, 6%, or 3%.

The BMS 101 can determine one or more anomaly class indices indicating one or more levels of anomalies of the one or more anomaly classes. For example, the BMS 101 can determine bending index and swelling index indicating the levels of bending and levels of swelling respectively. The BMS 101 can determine one or more anomaly class indices, indicating one or more levels of anomalies of one or more anomaly classes, for determining whether the one or more anomalies of one or more anomaly classes are present in the battery 104. The BMS 101 can determine the one or more anomaly class indices based on the probability of the battery being healthy (Phealthy), and the one or more probabilities of the battery having anomalies of the one or more classes (Panomaly_class-1-N). In an embodiment, Phealthy and Panomaly_class-1-N can be utilized by statistical classifiers or deep learning network based classifiers for determining the one or more anomaly class indices such as, for example, bending index, swelling index, dent index, etc. The deep learning network based classifier can be a dense neural network or a LSTM neural network.

Figure 8:
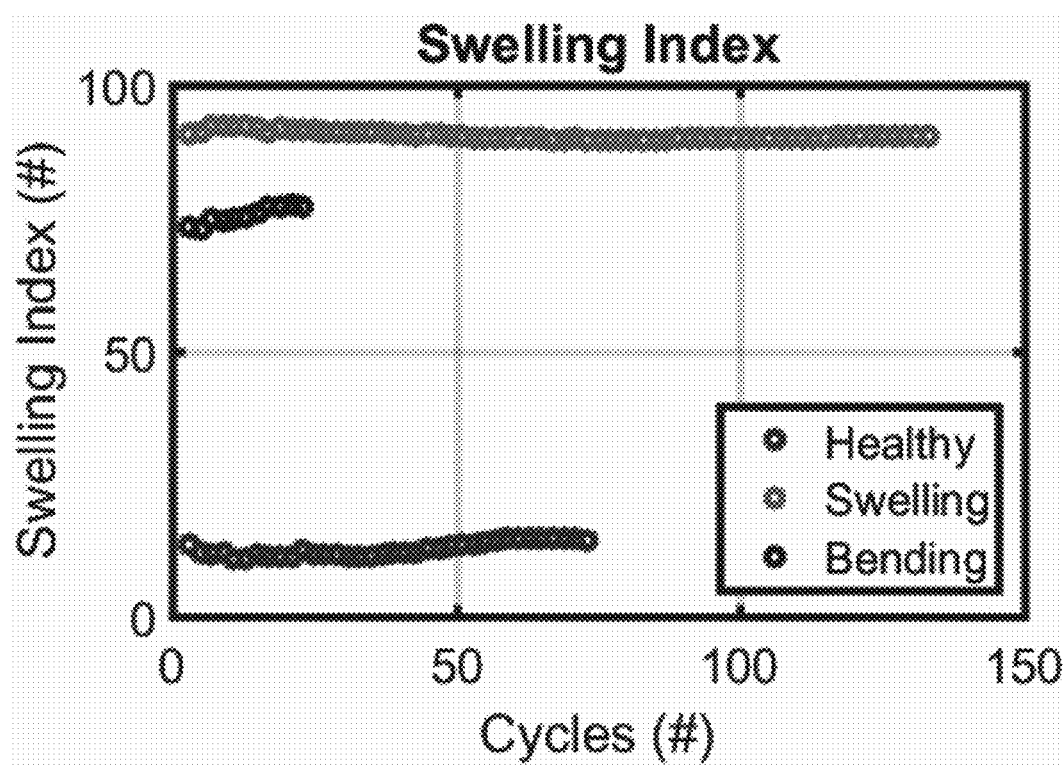
FIG. 8 depicts an example plot of swelling index with respect to number of charging-discharging cycles undergone by the battery according to embodiments.

FIG. 8 depicts an example plot of swelling index with respect to number of charging-discharging cycles undergone by the battery 104 according to embodiments. As depicted in FIG. 8, if the battery 104 is defective due to the presence of anomaly of class swelling, the swelling index can be high. The swelling index can be relatively lower, if the battery 104 is defective due to the presence of anomalies of other classes such as bending. The swelling index can be low if the battery 104 is healthy. Thus, for a healthy battery without any anomalies, the swelling index indicating the level of anomaly of anomaly class swelling will be low.

Figure 9:
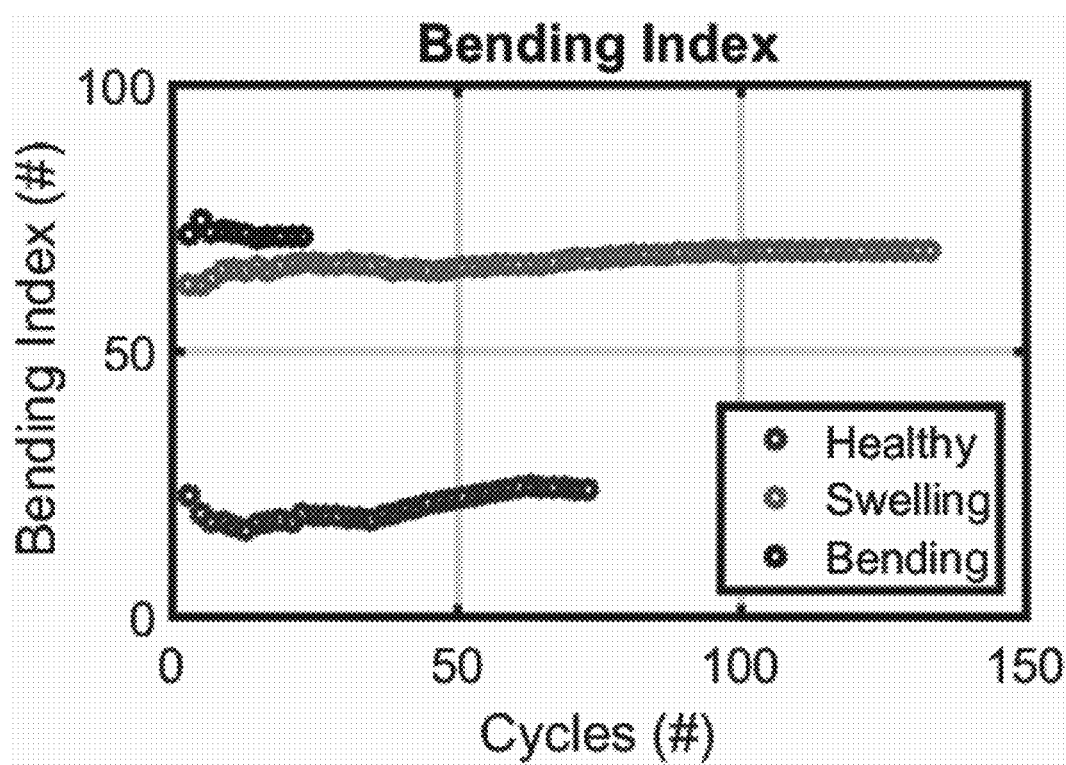
FIG. 9 depicts an example plot of bending index with respect to number of charging-discharging cycles undergone by the battery according to embodiments.

FIG. 9 depicts an example plot of bending index with respect to number of charging-discharging cycles undergone by the battery 104 according to embodiments. As depicted in FIG. 8, if the battery 104 is defective due to the presence of anomaly of class bending, the bending index can be high. The bending index can be relatively lower, if the battery 104 is defective due to the presence of anomalies of other classes such as swelling. The bending index can be low if the battery 104 is healthy. Thus, for a healthy battery without any anomalies, the bending index indicating the level of anomaly of anomaly class bending will be low.

The BMS 101 can report or provide one or more messages for indicating an instruction to a user of the device or electric vehicle 100 to replace the battery 104. The one or more messages can be displayed on the display 105. In an embodiment, the BMS 101 can report one or more messages if the level of reliability of usage of the battery 104, indicated by the reliability index, is less than the preset threshold value of the reliability index. In another embodiment, the BMS 101 can also report one or more messages if values of the one or more anomaly class indices, indicating one or more levels of anomalies of the one or more anomaly classes present in the battery 104, is greater than one or more preset threshold values of the one or more anomaly class indices.

FIG. 1 shows exemplary units of the device or electric vehicle 100, but it is to be understood that other embodiments are not limited thereon. In other embodiments, the device or electric vehicle 100 may include less or more number of units. Further, the labels or names of the units of the device or electric vehicle 100 are used only for illustrative purpose and does not limit the scope of the present disclosure. One or more units can be combined together to perform same or substantially similar function in the device or electric vehicle 100.

Figure 10:
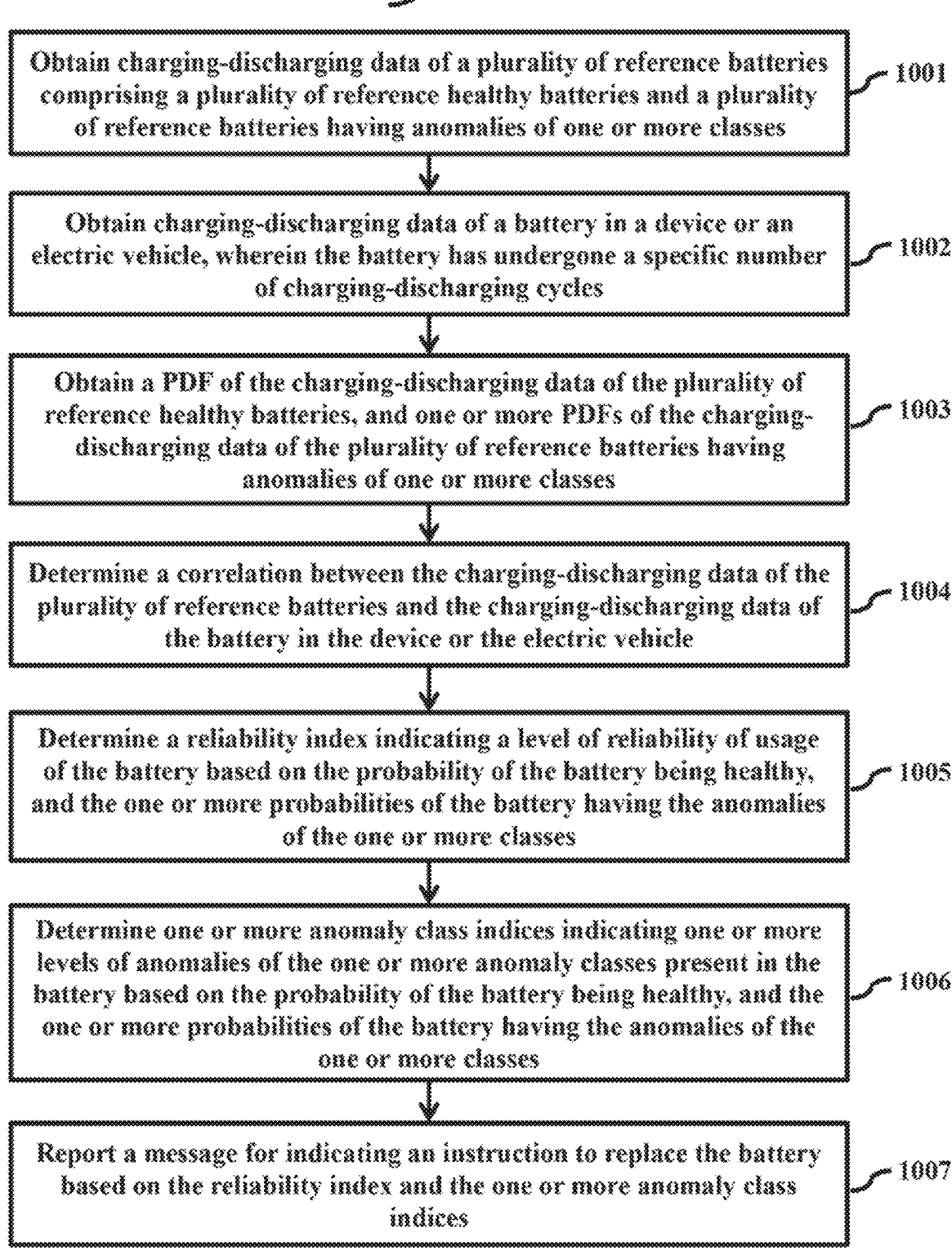
FIG. 10 is a flowchart detecting a method for determining whether a battery is defective, based on detection of anomalies in the battery, identifying anomalies of one or more classes, and extent of the identified anomalies of one or more classes according to embodiments.

FIG. 10 is a flowchart 1000 detecting a method for determining whether a battery 104 is defective, based on detection of anomalies in the battery 104, identifying anomalies of one or more classes, and extent of the identified anomalies of one or more classes according to embodiments. At step 1001, the method includes obtaining charging-discharging data of a plurality of reference batteries. The plurality of reference batteries includes a plurality of reference healthy batteries and a plurality of reference batteries having anomalies of one or more classes. The charging-discharging data comprises variation of voltage of the plurality of reference batteries with respect to SOC of the plurality of reference batteries, and variation of current of the plurality of reference batteries with respect to the SOC of the plurality of reference batteries, during charging-discharging cycles.

At step 1002, the method includes obtaining charging-discharging data of the battery 104 in the device or the electric vehicle 100, wherein the battery 104 has undergone a specific number of charging-discharging cycles. At step 1003, the method includes obtaining a probability density function (PDF) of the charging-discharging data of the plurality of reference healthy batteries, and one or more PDFs of the charging-discharging data of the plurality of reference batteries having anomalies of one or more classes. At step 1004, the method includes determining a correlation between the charging-discharging data of the plurality of reference batteries and the charging-discharging data of the battery 104 in the device or the electric vehicle 100.

In an embodiment, the correlation involves determining a probability of the battery 104 being healthy and one or more probabilities of the battery 104 possessing the anomalies of one or more classes. The probability of the battery being healthy can be determined based on the PDF of the charging-discharging data of the plurality of healthy reference batteries. The one or more probabilities of the battery possessing anomalies of one or more classes can be determined based on the one or more PDFs of the charging-discharging data of the plurality of reference batteries having anomalies of one or more classes.

At step 1005, the method includes determining a reliability index indicating a level of reliability of usage of the battery 104. In an embodiment, the reliability index can be determined based on the probability of the battery 104 being healthy, and the one or more probabilities of the battery 104 having the anomalies of the one or more classes. At step 1006, the method includes determining one or more anomaly class indices indicating one or more levels of anomalies of the one or more anomaly classes present in the battery 104. The one or more anomaly class indices can be determined based on the probability of the battery being healthy, and the one or more probabilities of the battery having anomalies of the one or more classes.

At step 1007, the method includes reporting a message for indicating an instruction to replace the battery. The message can be reported if the level of reliability of usage of the battery, indicated by the reliability index, is less than a preset reliability threshold, or the one or more anomaly class indices, indicating the one or more levels of anomalies of the one or more anomaly classes present in the battery 104, is more than preset one or more anomaly class indices thresholds.

The various steps in the flowchart 1000 may be performed in the order presented, in a different order, or simultaneously. Further, in some embodiments, some actions listed in FIG. 10 may be omitted.

The embodiments disclosed herein can be implemented through at least one software program running on at least one hardware device and performing network management functions to control the network elements. The network elements shown in FIG. 1 include blocks which can be at least one of a hardware device, or a combination of hardware device and software module.

The embodiments disclosed herein describe methods and systems for providing a sensing framework for detecting the presence of one or more anomaly classes in a battery, which are likely to act as factors contributing to defective battery behavior in the battery. The embodiments allow online, real-time, sensing of one or more anomaly class that can cause defects on battery operation. The embodiments enable real time monitoring of parameters of batteries in devices and electrical vehicles, which can influence charging or discharging data. The embodiments can utilize battery parameters, which have been measured by battery management systems of devices and electrical vehicles, such as current and voltage, for determining whether a battery is in healthy condition or defective condition. The embodiments can detect the presence of one or more anomaly classes, and the levels of anomaly classes, in a battery using limited computational expense, and, hence, can be integrated with battery management systems of the devices and the electrical vehicles. The classification of anomalies present in the batteries of the devices and the electrical vehicles may allow determining the cause of occurrence of the anomalies in the batteries. The embodiments prevent or reduce the necessity of inclusion of specific or specialized hardware in the battery management systems of the devices and the electrical vehicles for detection of defective battery behavior. The embodiments are independent of battery type, i.e., can be utilized for detecting battery condition, healthy or defective, irrespective of the type of battery or battery chemistry. The embodiments issue alerts for indicating the users of the devices and the electrical vehicles about any imminent accident or hazard related to the batteries of the devices and the electrical vehicles.

Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in example very high speed integrated circuit hardware description language (VHDL), or any other programming language, or implemented by one or more VHDL or several software modules being executed on at least one hardware device. The hardware device can be any kind of portable device that can be programmed. The device may also include means, which could be, for example, a hardware means, for example, an application-specific integrated circuit (ASIC), or a combination of hardware and software means, for example, an ASIC and a field programmable gate array (FPGA), or at least one microprocessor and at least one memory with software modules located therein. The method embodiments described herein could be implemented partly in hardware and partly in software. The n may be implemented on different hardware devices, e.g. using a plurality of central processing units (CPUs).

The foregoing description of the embodiments are directed to the general nature of the embodiments herein that others can, by applying current knowledge, readily modify and/or adapt for various applications such embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

What is claimed is:

1. A method for detecting at least one anomaly in a battery, the method comprising:
    obtaining, by a processor, charging-discharging data of the battery that has undergone a preset number of charging-discharging cycles;
    obtaining, by the processor, a probability of the battery being healthy and at least one probability of the battery having an anomaly of at least one class, based on a correlation between charging-discharging data of a plurality of reference batteries and the charging-discharging data of the battery;
    obtaining, by the processor, a reliability index indicating a level of reliability of usage of the battery based on the probability of the battery being healthy, the at least one probability of the battery having anomaly of the at least one class;
    obtaining, by the processor, at least one anomaly class index indicating at least one level of anomaly of the at least one class based on the probability of the battery being healthy, the at least one probability of the battery having the anomaly of the at least one class; and
    alerting a user of an electronic device including the battery based on the reliability index and the at least one anomaly class index,
    wherein the at least one anomaly class index comprises at least one of bending index, swelling index or dent index.

2. The method, as claimed in claim 1, wherein the charging-discharging data of the plurality of reference batteries comprises charging-discharging data of a plurality of healthy reference batteries and charging-discharging data of a plurality of reference batteries having anomaly of the at least one class.

3. The method, as claimed in claim 1, wherein the charging-discharging data of the battery and the charging-discharging data of the plurality of reference batteries comprise one of a variation of a voltage and a variation of a current with respect to state-of-charge (SOC) during a charging-discharging cycle.

4. The method, as claimed in claim 1, wherein the correlation is obtained based on a plurality of probability density functions (PDFs) of the charging-discharging data of the plurality of reference batteries.

5. The method, as claimed in claim 1, wherein the reliability index and the at least one anomaly class index is obtained based on one of statistical classifier and a deep learning based classifier,
 wherein the deep learning based classifier is one of a dense neural network and a Long Short-Term Memory (LSTM) neural network.

6. The method, as claimed in claim 1, wherein the method further comprises:
 providing, by the processor, a message indicating an instruction to replace the battery, based on the level of reliability of usage of the battery being less than a preset reliability threshold.

7. A processor configured to detect at least one anomaly in a battery, the processor being configured to:
 obtain charging-discharging data of the battery that has undergone a preset number of charging-discharging cycles;
 obtain a probability of the battery being healthy and at least one probability of the battery having an anomaly of the at least one class, based on a correlation between charging-discharging data of a plurality of reference batteries and the charging-discharging data of the battery;
 obtain a reliability index indicating a level of reliability of usage of the battery based on the probability of the battery being healthy, the at least one probability of the battery having the anomaly of the at least one class;
 obtain at least one anomaly class index indicating at least one level of anomaly of the at least one class based on the probability of the battery being healthy, the at least one probability of the battery having the anomaly of the at least one class; and
 alert a user of the processor based on the reliability index and the at least one anomaly class index,
 wherein the at least one anomaly class index comprises at least one of bending index, swelling index or dent index.

8. The processor, as claimed in claim 7, wherein the charging discharging data of the plurality of reference batteries comprises charging-discharging data of a plurality of healthy reference batteries and charging-discharging data of a plurality of reference batteries having anomaly of the at least one class.

9. The processor, as claimed in claim 7, wherein the charging-discharging data of the battery and the charging-discharging data of the plurality of reference batteries comprises one of a variation of a voltage and a variation of a current with respect to state-of-charge (SOC) during a charging-discharging cycle.

10. The processor, as claimed in claim 7, wherein the correlation is obtained using a plurality of probability density functions (PDFs) of the charging-discharging data of the plurality of reference batteries.

11. The processor, as claimed in claim 7, wherein the reliability index and the at least one anomaly class index is obtained based on one of statistical classifier and a deep learning based classifier,
 wherein the deep learning based classifier is one of a dense neural network and a Long Short-Term Memory (LSTM) neural network.

12. An electronic device comprising:
 a battery; and
 a processor configured to detect at least one anomaly in the battery, the processor being configured to:
 obtain charging-discharging data of the battery that has undergone a preset number of charging-discharging cycles;
 obtain a probability of the battery being healthy and at least one probability of the battery having an anomaly of the at least one class, based on a correlation between charging-discharging data of a plurality of reference batteries and the charging-discharging data of the battery;
 obtain a reliability index indicating a level of reliability of usage of the battery based on the probability of the battery being healthy, the at least one probability of the battery having the anomaly of the at least one class;
 obtain at least one anomaly class index indicating at least one level of anomaly of the at least one class based on the probability of the battery being healthy, the at least one probability of the battery having the anomaly of the at least one class; and
 alert a user of the processor based on the reliability index and the at least one anomaly class index,
 wherein the at least one anomaly class index comprises at least one of bending index, swelling index or dent index.

13. The electronic device, as claimed in claim 12, wherein the charging discharging data of the plurality of reference batteries comprises charging-discharging data of a plurality of healthy reference batteries and charging-discharging data of a plurality of reference batteries having anomaly of the at least one class.

14. The processor, as claimed in claim 12, wherein the charging-discharging data of the battery and the charging-discharging data of the plurality of reference batteries comprises one of a variation of a voltage and a variation of a current with respect to state-of-charge (SOC) during a charging-discharging cycle.

15. The processor, as claimed in claim 12, wherein the correlation is obtained using a plurality of probability density functions (PDFs) of the charging-discharging data of the plurality of reference batteries.

* * * * *